(12) United States Patent
Dalum

(10) Patent No.: US 6,430,489 B1
(45) Date of Patent: Aug. 6, 2002

(54) RESTRAINT DEPLOYMENT CONTROL METHOD WITH FEED-FORWARD ADJUSTMENT OF DEPLOYMENT THRESHOLD

(75) Inventor: Joseph Thomas Dalum, Noblesville, IN (US)

(73) Assignee: Delphi Technologies, Inc., Troy, MI (US)

(*) Notice: Subject to any disclaimer, the term of this patent is extended or adjusted under 35 U.S.C. 154(b) by 123 days.

(21) Appl. No.: 09/197,878

(22) Filed: Nov. 23, 1998

(51) Int. Cl.[7] .............................. B60R 22/00; G06F 7/00
(52) U.S. Cl. .............................. 701/45; 701/36; 701/46; 340/436; 280/735
(58) Field of Search .............................. 701/45, 46, 47, 701/36; 280/735, 731, 732, 728.1, 734; 340/903, 436, 438, 667, 669; 180/271, 282

(56) References Cited

U.S. PATENT DOCUMENTS

| | | | | |
|---|---|---|---|---|
| 4,975,850 A | * | 12/1990 | Diller | 701/45 |
| 5,040,118 A | * | 8/1991 | Diller | 701/45 |
| 5,065,322 A | * | 11/1991 | Mazur et al. | 701/47 |
| 5,418,722 A | * | 5/1995 | Cashler | 701/45 |
| 5,521,822 A | * | 5/1996 | Wang | 701/45 |
| 5,801,619 A | * | 9/1998 | Liu et al. | 701/45 |
| 5,964,817 A | * | 10/1999 | Dalum et al. | 701/45 |
| 5,969,599 A | * | 10/1999 | Wessels et al. | 701/45 |
| 5,999,871 A | * | 12/1999 | Liu | 701/45 |
| 6,012,007 A | * | 1/2000 | Fortune et al. | 701/45 |
| 6,036,225 A | * | 3/2000 | Foo et al. | 701/45 |

* cited by examiner

Primary Examiner—Jacques H. Louis-Jacques
(74) Attorney, Agent, or Firm—Jimmy L. Funke

(57) ABSTRACT

An improved deployment method for a vehicular supplemental restraint system having an acceleration sensor and a restraint device to be deployed for occupant protection in a crash event, where the deployment threshold is adaptively adjusted based on the magnitude and rate of change of a filtered acceleration signal and the progression level of the sensed event. The deployment threshold is periodically adjusted based on the rate of change of the filtered acceleration signal, if the magnitude of the filtered acceleration signal is within a range specified for the progression level of the sensed event. The maximum amount of adjustment is also specified based on the progression level of the event. As a result, the deployment threshold tends to follow or track the filtered acceleration signal, particularly for non-deployment events where the magnitude of the filtered acceleration signal is within the specified range, thereby preventing deployment of the restraints. In deployment events, the magnitude of the filtered acceleration signal is more likely to fall outside the specified range, which minimizes feed-forward adjustment of the deployment threshold, thereby minimizing any delay in deployment of the restraints.

10 Claims, 4 Drawing Sheets

RESTRAINT DEPLOYMENT CONTROL METHOD WITH FEED-FORWARD ADJUSTMENT OF DEPLOYMENT THRESHOLD

This invention relates to automotive passenger restraint systems, and more particularly to a control method that differentiates deployment events from non-deployment events.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving.

A problem with the above-described approach is that it is often difficult to synchronize the time progression of the crash (that is, the event clock or timer) with the actual crash event. As a result, it can be difficult to distinguish between deployment events and non-deployment events, particularly in the first portion of the sensed event.

SUMMARY OF THE PRESENT INVENTION

The present invention is directed to an improved deployment control method for a vehicular supplemental restraint system having an acceleration sensor and a restraint device to be deployed for occupant protection in a crash event, where the deployment threshold is adaptively adjusted based on the magnitude and rate of change of the $\Delta V$ signal and the progression level of the sensed event. Since the deployment threshold is adjusted as a function of the input ($\Delta V$) signal, the control is characterized herein as a feed-forward control.

According to the invention, the acceleration signal is filtered (integrated) to form the $\Delta V$ signal, and the deployment threshold is periodically adjusted based on the rate of change (slope) of the $\Delta V$ signal, if the magnitude of the $\Delta V$ signal is within a $\Delta V$ range specified for the progression level of the sensed event. Preferably, the maximum amount of adjustment is also specified based on the progression level of the event. As a result, the deployment threshold tends to follow or track the $\Delta V$ signal, particularly for non-deployment events where the magnitude of the $\Delta V$ signal is within the specified $\Delta V$ range, thereby preventing deployment of the restraints. In deployment events, the magnitude of the $\Delta V$ signal is more likely to fall outside the specified $\Delta V$ range, which minimizes feed-forward adjustment of the deployment threshold, thereby minimizing any delay in deployment of the restraints.

BRIEF DESCRIPTION OF THE DRAWINGS

FIG. 5 is a main flow diagram, and FIG. 6 details a step of the main flow diagram relating to determination of a feed-forward adjustment of the deployment threshold.

DETAILED DESCRIPTION OF THE DRAWINGS

Figure 1:
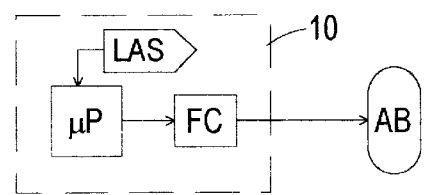
FIG. 1 is a schematic diagram of a supplemental restraint system including a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ filters the longitudinal acceleration signal over a predefined interval, or window, to form a windowed velocity signal, referred to herein as $\Delta V_{WIN}$. The microprocessor $\mu P$ then adjusts a deployment threshold, referred to herein as a $\Delta V$ Threshold, based on event progression and the magnitude and rate of change of $\Delta V_{WIN}$, and compares $\Delta V_{WIN}$ to the $\Delta V$ Threshold. If $\Delta V_{WIN}$ crosses the $\Delta V$ Threshold, the microprocessor $\mu P$ signals the firing circuit FC to deploy the air bags AB.

According to the present invention, the $\Delta V$ Threshold is set at a default level prior to initiation of a crash event and is periodically adjusted during the crash event based on the rate of change (slope) of $\Delta V_{WIN}$, if the magnitude of $\Delta V_{WIN}$ is within a $\Delta V$ range specified for the progression level of the event. Additionally, the maximum amount of adjustment is also specified based on the progression level of the event. Thus, for any given progression level of the event, the control of this invention specifies a $\Delta V$ range within which $\Delta V_{WIN}$ must fall in order to enable threshold adjustment, and a limit on the amount of the adjustment. Since the slope of $\Delta V_{WIN}$ may be either positive or negative, the threshold may be adjusted either upward or downward, depending on the particular crash signal. Alternatively, threshold adjustment may be limited to positive slope values, in which case only upward adjustment of the threshold can occur. The upper limit of the $\Delta V$ range is selected so that, in general, non-deployment events are more subject to adjustment than deployment events, especially in the early progression of the event. This minimizes any deployment delay for deployment events, while permitting significant adjustment of the threshold when $\Delta V_{WIN}$ is within the $\Delta V$ range, thereby allowing the deployment threshold to follow or track $\Delta V_{WIN}$ during non-deployment events.

The windowed velocity signal $\Delta V_{WIN}$ may be calculated according to the expression:

$$\Delta V_{WIN}(n)=\Sigma[\text{ACCEL}(n-i)], \text{ for } i=0 \text{ to } (w-1) \quad (1)$$

where ACCEL is a filtered version of the output of acceleration sensor LAS and w is the window size. In a digital implementation, the window w actually refers to a specified number of successive samples of the acceleration signal. Since the samples are read at a predefined rate, however, the window w also may be viewed as a corresponding time interval.

The slope or rate of change of $\Delta V_{WIN}$, referred to herein as $\Delta V_{slope}$, may be determined according to the expression:

$$\Delta V_{slope}(n)=\Delta V_{WIN}(n)-\Delta V_{WIN}(n-1) \quad (2)$$

where (n) refers to a current value, and (n−1) refers to a value determined in the previous calculation.

In the preferred embodiment, the level of event progression is determined by computing a velocity signal $\Delta V_{bias}$ that is biased toward zero. The biased velocity signal $\Delta V_{bias}$ may be determined by computing a filtered acceleration signal $\Delta V$, and then applying a bias "B". For example, $\Delta V$ may be calculated according to the expression:

$$\Delta V(n)=\Delta V(n-1)+\text{ACCEL}(n)-\Delta V(n-1)/C \quad (3)$$

where C is a constant, with $\Delta V_{bias}$ being defined as:

$$\Delta V_{bias}=\Delta V - B \quad (4)$$

and the bias B being defined as:

$$B = \begin{cases} d & \text{if } \Delta V > d, \text{ with } d \text{ being a positive integer} \\ \Delta V & \text{if } |\Delta V| \leq d \\ -d & \text{if } \Delta V < -d \end{cases} \quad (5)$$

Alternatively, the level of event progression can be determined based on windowed velocity $\Delta V_{WIN}$ or the time that $\Delta V_{WIN}$ is above a specified threshold. For purposes of this description, however, it will be assumed that $\Delta V_{bias}$ is used to determine the level of event progression. To this end, $\Delta V_{bias}$ is compared to a series of predefined velocity values, referred to herein as progression level thresholds a–d, thereby defining four corresponding stages or levels of event progression; obviously, the number of thresholds, and hence progression levels, may vary from one implementation to another.

Figure 2:
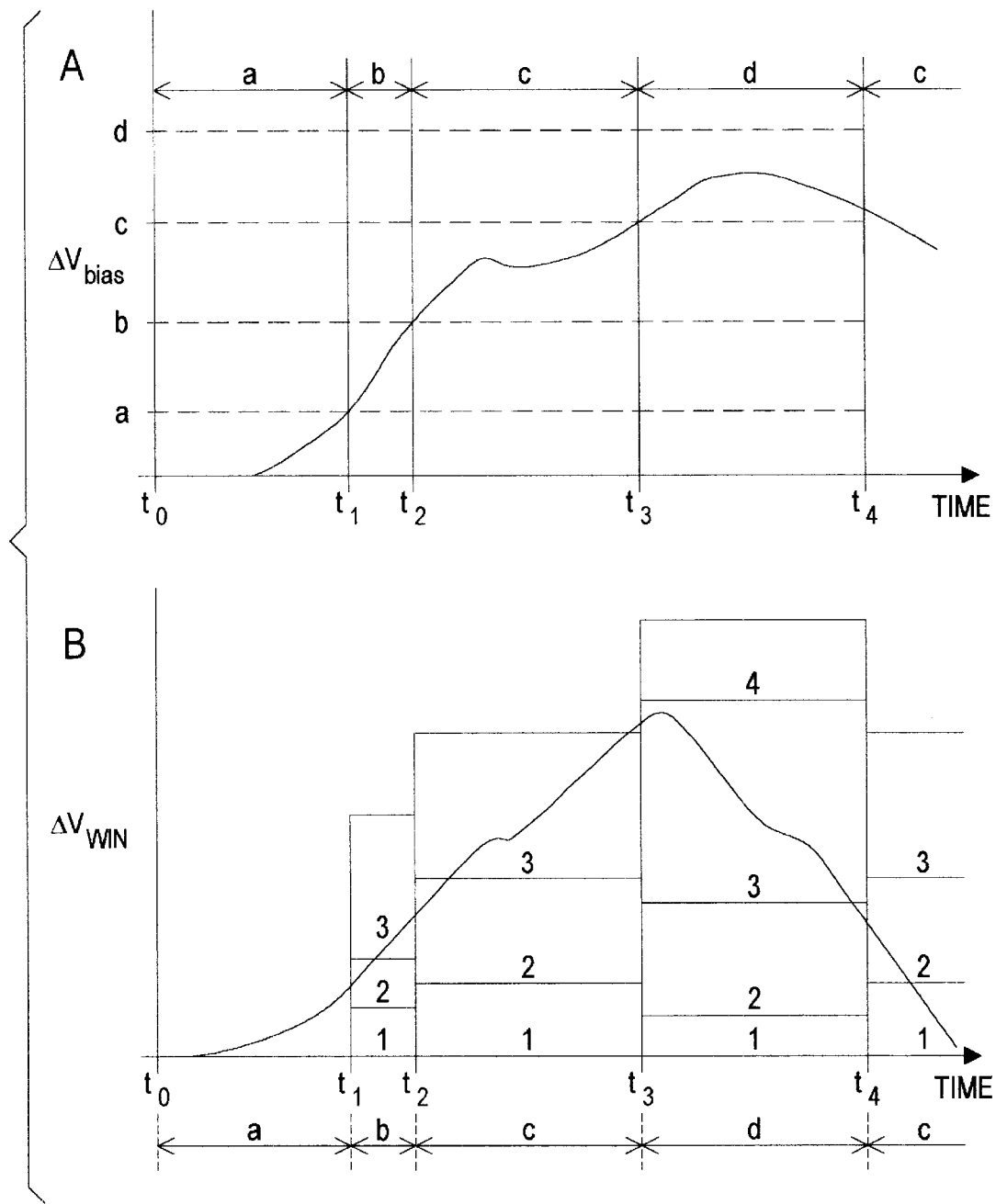
FIG. 2 is a graphical representation of event progression determination and threshold modification according to this invention.

The above-described method is graphically depicted in FIG. 2, where Graphs A and B show exemplary values of $\Delta V_{bias}$ and $\Delta V_{WIN}$, respectively, on a common time scale. The time designations $t_1$–$t_4$ signify times that coincide with $\Delta V_{bias}$ crossing one of the thresholds a–d, and the event progression level at any given time is indicated at the top of Graph A, and below the time axis of Graph B. For example, progression level of the sensed event is "a" in the time interval $t_0$–$t_1$, "b" in the time interval $t_1$–$t_2$, "c" in the time interval $t_2$–$t_3$, "d" in the time interval $t_3$–$t_4$, and so on. The progression level "a" is indicative of no or very low activity. Each of the progression levels a–d are associated with one or more predefined $\Delta V_{WIN}$ ranges as shown by the vertical columns in Graph B, with an adjustment limit specified for each $\Delta V_{WIN}$ range. Within these limits, the deployment threshold is adjusted based on the value of $\Delta V_{slope}$. As an example, if the sensed event is in progression level "b", adjustment of the threshold might be limited to 10 counts if $\Delta V_{WIN}$ is within range 1, 20 counts if $\Delta V_{WIN}$ is within range 2, and 30 counts if $\Delta V_{WIN}$ is within range 3, it being understood that the number of counts is arbitrarily related to the actual units of $\Delta V_{WIN}$.

Figure 3:
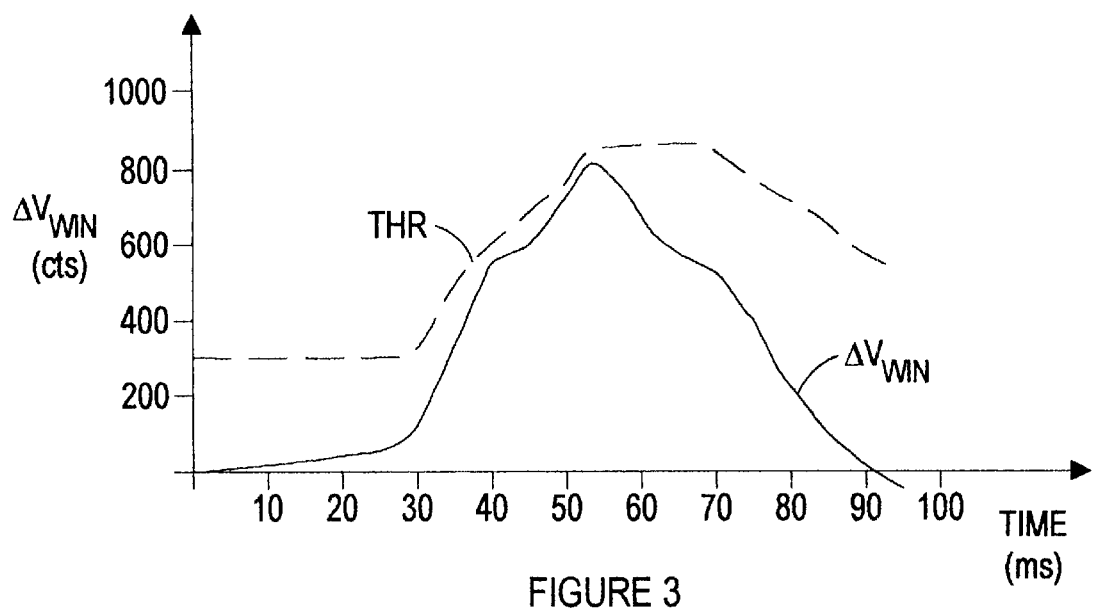
FIG. 3 graphically depicts the operation of the control method of this invention for a non-deployment event.
Figure 4:
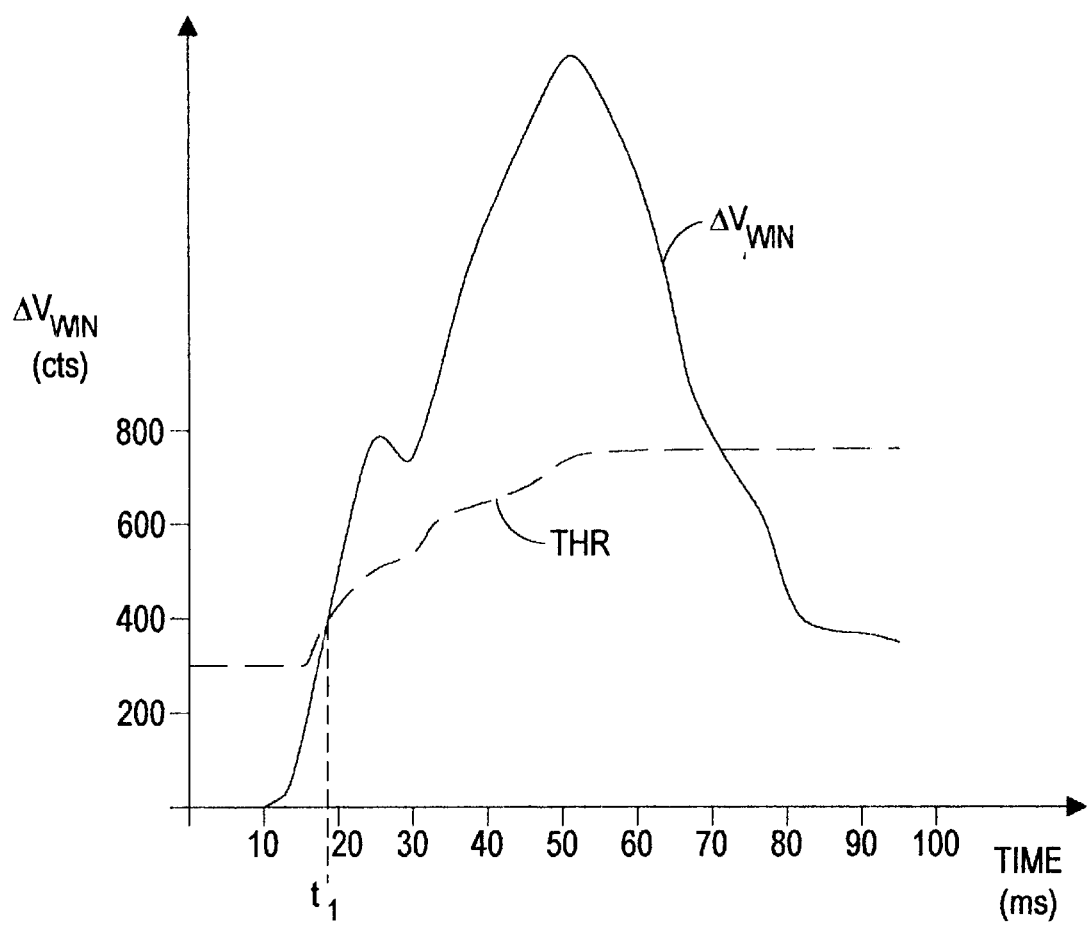
FIG. 4 graphically depicts the operation of the control method of this invention for a deployment event.

The operation of the above-described feed-forward threshold adjustment technique can be illustrated in reference to FIGS. 3 and 4 which graphically depict the deployment threshold (THR) and $\Delta V_{WIN}$ as a function of time for representative non-deployment and deployment events, respectively. In the non-deployment event of FIG. 3, which may be a 9 MPH frontal collision for example, $\Delta V_{WIN}$ stays within the upper $\Delta V$ limit, and the deployment threshold THR is adjusted upward with $\Delta V_{slope}$ (within limits). As a result, the threshold THR tends to track $\Delta V_{WIN}$, and deployment never occurs because $\Delta V_{WIN}$ never exceeds THR. On the other hand, in the deployment event of FIG. 4, which may be a 30 MPH frontal collision, adjustment of the threshold THR is somewhat limited, due to one or more of three factors: (1) $\Delta V_{WIN}$ is higher than the specified upper $\Delta V$ limit (in which case, no adjustment occurs), (2) $\Delta V_{slope}$ is higher than the specified slope limit, and (3) the adaptation amount exceeds an adaptation limit. As a result, $\Delta V_{WIN}$ quickly exceeds the threshold THR, resulting in deployment of the restraints at time $t_1$. Since the initial upward adjustment of the threshold THR is much less than $\Delta V_{slope}$, the deployment is only slightly delayed, as compared to the time of deployment if there were no adjustment of the threshold THR. It will also be noted in FIG. 4 that the threshold THR is only adjusted upward, even when $\Delta V_{slope}$ is negative; this is optional as explained above, and in any event, is irrelevant once deployment occurs.

The examples described above in reference to FIGS. 3 and 4 illustrate how the feed-forward threshold adjustment of this invention provides immunity to non-deployment events while minimizing any delay in deployment in a deployment event. By contrast, a fixed threshold set high enough to avoid deployment in the collision of FIG. 3, and would significantly delay deployment in the collision of FIG. 4.

Figure 5:
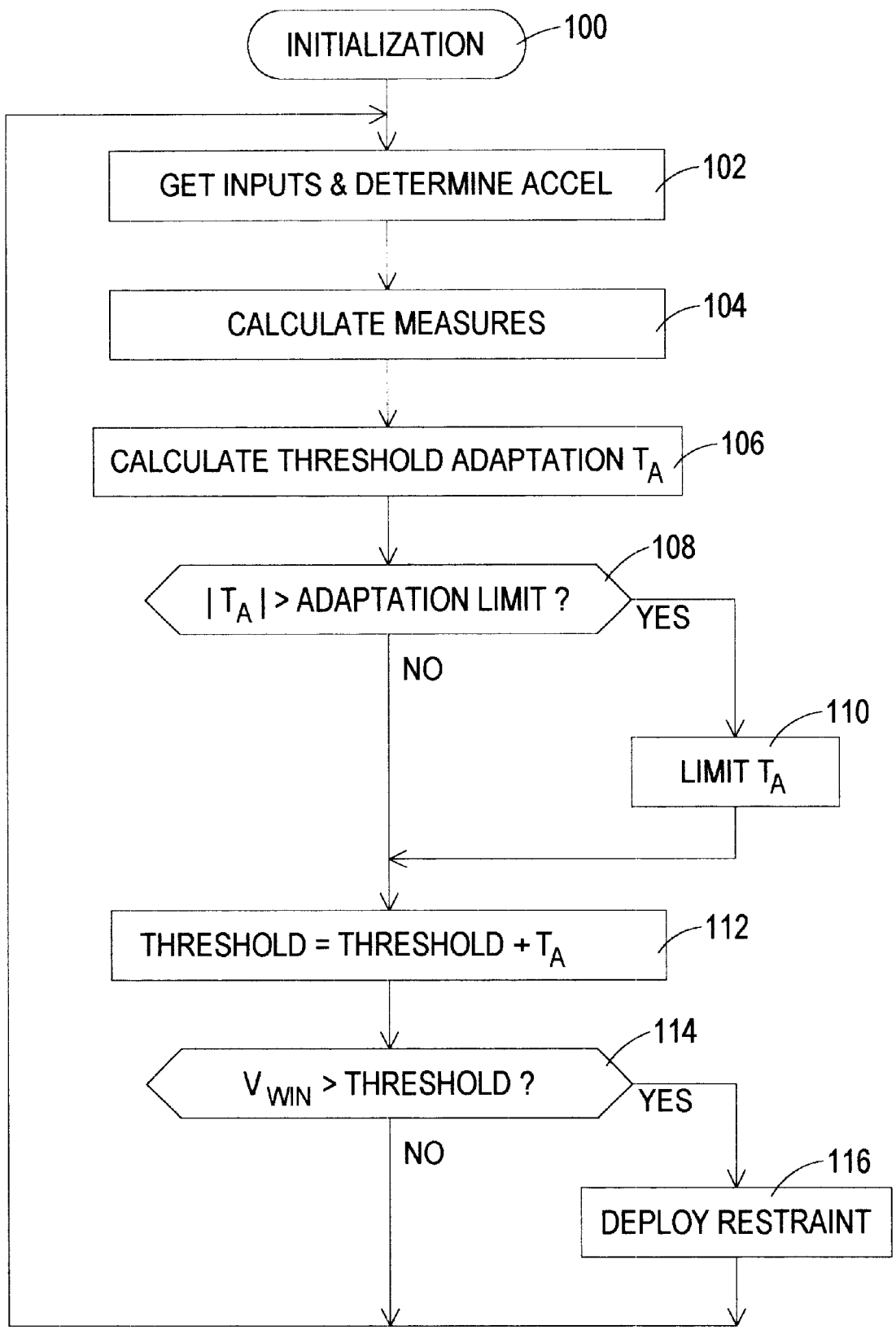
FIGS. 5–6 are flow diagrams representative of computer program instructions executed by the microprocessor of FIG. 1 in carrying out the deployment method of this invention.
Figure 6:
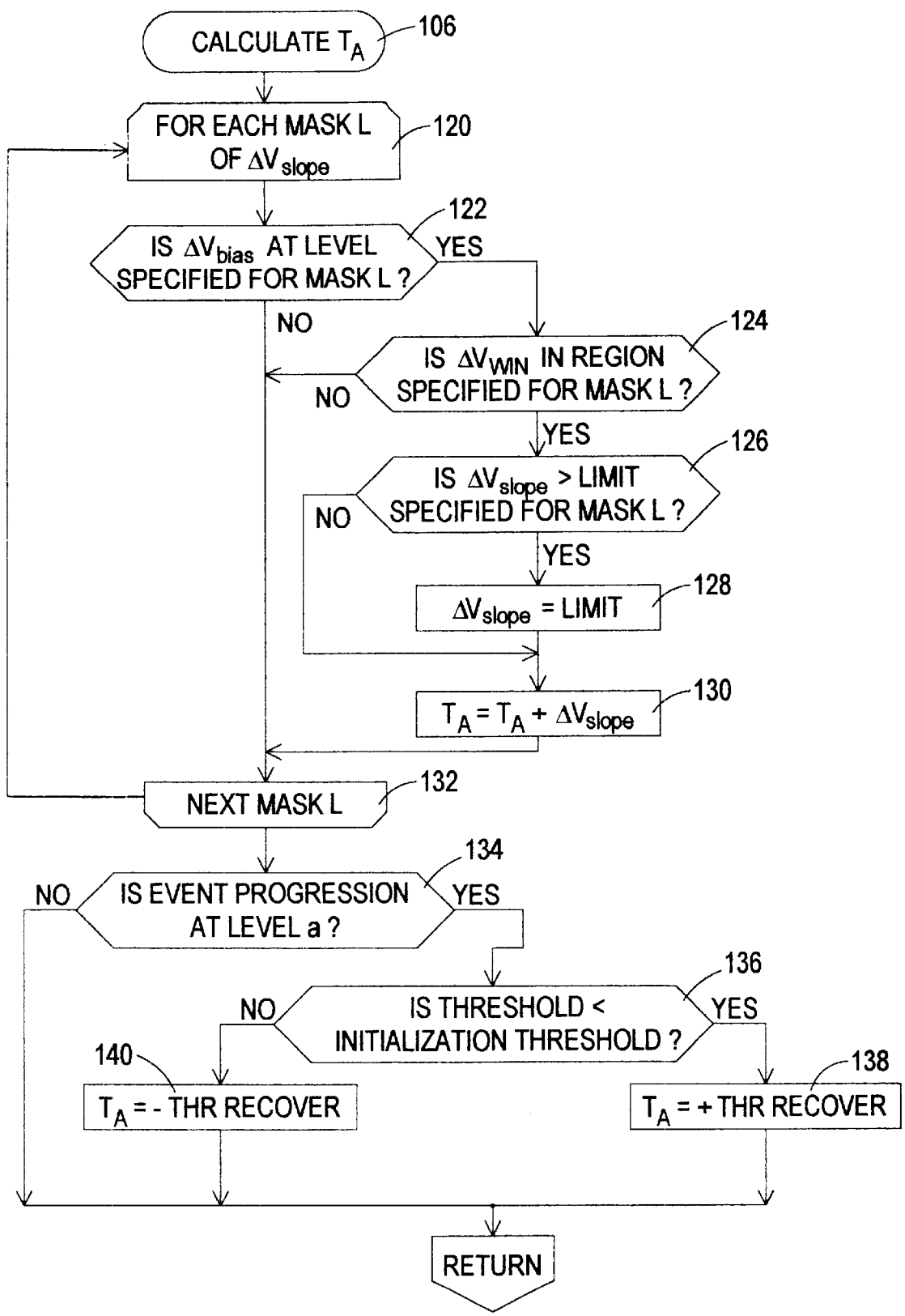

A flow diagram representative of computer program instructions executed by the microprocessor $\mu$P of FIG. 1 in carrying out the above-described deployment method is set forth in FIGS. 5–6. FIG. 5 depicts a main loop flow diagram, where the block 100 designates a series of instructions executed at the initiation of vehicle operation for initializing various registers, counters, flags and variables to a predefined state. For example, the $\Delta V$ Threshold is initialized to a default value at this point. Thereafter, the block 102 is executed to read the output signal of the longitudinal acceleration sensor LAS, and to filter it to form a filtered acceleration signal ACCEL. The various severity measurements are then computed at block 104; these include, for example, $\Delta V$, $\Delta V_{bias}$, $\Delta V_{WIN}$, $\Delta V_{slope}$, etc. Block 106 is then executed to determine a net threshold adaptation amount $T_A$, as described in detail below in reference to FIG. 6. If the magnitude of the determined adaptation amount $T_A$ is greater than a limit value, as determined at block 108, the block 110 is executed to suitably limit adaptation amount $T_A$. Then, the adaptation amount $T_A$ (which can be either positive or negative) is added to the $\Delta V$ Threshold at block 112. If the windowed velocity $\Delta V_{WIN}$ exceeds the newly adjusted threshold, as determined at block 114, the block 116 is executed to deploy the restraints AB.

The flow diagram of FIG. 6 sets forth the main flow diagram step of determining the net threshold adaptation amount $T_A$ (block 106) in further detail. In the illustrated embodiment, the various event progression thresholds a–d, the $\Delta V$ ranges, and the associated limits are stored in an adaptation matrix within microprocessor $\mu$P, and a series of progression level masks are used to identify corresponding ranges and adjustment limits. Blocks 120–132 comprise a loop for determining the appropriate $\Delta V$ range and limit, taking into account the progression level and the magnitude of $\Delta V_{WIN}$. Thus, for each progression level mask L, the microprocessor $\mu P$ executes the blocks 122–130 within the progression level loop boundary blocks 120 and 132. At block 122, the current mask L is applied to the matrix, and the microprocessor $\mu P$ determines if the biased velocity $\Delta V_{bias}$ is within the corresponding progression level thresholds. For example, when the mask for progression level b is selected, block 122 determines if $\Delta V_{bias}$ is between the values a and b, as defined in FIG. 2. If not, the mask L for the next progression level is applied to the matrix, as indicated at block 132. If $\Delta V_{bias}$ is within the corresponding progression level thresholds, block 124 determines if $\Delta V_{WIN}$ is within a specified $\Delta V$ range corresponding to the progression level of the mask L. If not, no adjustment is made; if so, blocks 126–128 are executed to limit $\Delta V_{slope}$ to a limit value specified by the mask, and block 130 increases the net threshold adjustment $T_A$ by $\Delta V_{slope}$. As indicated above, the threshold adjustment may be limited to positive values of $\Delta V_{slope}$, if desired; in some cases, this has been found to improve immunity to non-deployment events, such as operating the vehicle on a rough road.

After the net threshold adaptation amount $T_A$ is determined for each progression level mask L, the blocks 134–138 are executed to bias the $\Delta V$ Threshold toward its default value (initialization threshold) if the event progression level is "a"—i.e., no activity. Block 134 determines if the event progression is at level "a". If so, block 136 compares the $\Delta V$ Threshold to the Initialization Threshold. If the $\Delta V$ Threshold has been adjusted to a value less than the Initialization Threshold, block 138 sets the net threshold adaptation amount $T_A$ to a positive incremental value, referred to in FIG. 6 as +Threshold Recover. Conversely, if the $\Delta V$ Threshold has been adjusted to a value greater than the Initialization Threshold, block 138 sets the net threshold adaptation amount $T_A$ to a negative incremental value, referred to in FIG. 6 as −Threshold Recover.

In summary, the deployment method of this invention provides a novel, feed-forward control in which the deployment threshold is periodically adjusted based on $\Delta V_{slope}$, provided that the magnitude of $\Delta V_{WIN}$ is within the specified $\Delta V$ range. As a result, the deployment threshold tends to follow or track $\Delta V_{WIN}$ during non-deployment events, thereby allowing the threshold to have an initial or default value that is low enough to provide quick deployment of the restraints during deployment events. While described in reference to the illustrated embodiment, it is expected that various modifications in addition to those suggested above will occur to those skilled in the art. In this regard, it will be understood that this invention is not limited to the illustrated embodiment, and that control methods incorporating such modifications may fall within the scope of this invention, which is defined by the appended claims.

The embodiments of the invention in which an exclusive property or privilege is claimed are defined as follows:

1. In a vehicular supplemental restraint system having a sensor providing a vehicle acceleration signal, a restraint device and a controller for deploying the restraint device for vehicle occupant protection in a crash event when a filtered version of the acceleration signal exceeds a deployment threshold, the improvement wherein the controller:

initializes the deployment threshold at a default level prior to the crash event;

determines an event progression signal during the crash event based on the acceleration signal to detect predefined progression levels of the crash event;

determines a slope of the filtered acceleration signal;

periodically adjusts the deployment threshold based on the determined slope, provided that the filtered acceleration signal is within an adjustment range specified for the detected progression level of the crash event.

2. The improvement of claim 1, wherein said adjustment range is selected such that the controller causes the deployment threshold to substantially track the filtered acceleration signal during low severity crash events to prevent deployment, without significantly adjusting the deployment threshold during high severity crash events.

3. The improvement of claim 1, wherein said controller limits the determined slope to a limit value specified for the detected progression level of the crash event, thereby limiting the adjustment of the deployment threshold during a severe crash event.

4. The improvement of claim 1, wherein the controller progressively returns the deployment threshold to the default level after the crash event.

5. The improvement of claim 1, wherein the controller inhibits adjustment of the deployment threshold when the determined slope is negative.

6. A control method for a vehicular supplemental restraint system having a sensor providing a vehicle acceleration signal, a restraint device that can be deployed in a crash event for vehicle occupant protection, the method comprising the steps of:

initializing a deployment threshold at a default level prior to the crash event;

determining an event progression signal during the crash event based on the acceleration signal to detect predefined progression levels of the crash event;

filtering the acceleration signal to detect severity of the crash event, and determining a slope of the filtered acceleration signal;

periodically adjusting the deployment threshold based on the determined slope, provided that the filtered acceleration signal is within an adjustment range specified for the detected progression level of the crash event; and deploying the restraint device when the filtered acceleration signal exceeds the deployment threshold.

7. The control method of claim 6, wherein said adjustment range is selected such that the deployment threshold substantially tracks the filtered acceleration signal during low severity crash events to prevent deployment, but is not significantly adjusted during high severity crash events.

8. The control method of claim 6, including the step of limiting the determined slope to a limit value specified for the detected progression level of the crash event, thereby limiting the adjustment of the deployment threshold during a severe crash event.

9. The control method of claim 6, including the step of progressively returning the deployment threshold to the default level after the crash event.

10. The control method of claim 6, including the step of inhibiting adjustment of the deployment threshold when the determined slope is negative.

* * * * *